(12) United States Patent
Liu et al.

(10) Patent No.: US 9,854,418 B1
(45) Date of Patent: Dec. 26, 2017

(54) AUTOMATIC FRIEND CONNECTION WITHIN A SOCIAL NETWORK

(71) Applicant: INTERNATIONAL BUSINESS MACHINES CORPORATION, Armonk, NY (US)

(72) Inventors: Su Liu, Austin, TX (US); Eric J. Rozner, Austin, TX (US); Chin Ngai Sze, Austin, TX (US); Yaoguang Wei, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/266,297

(22) Filed: Sep. 15, 2016

(51) Int. Cl.
| | |
|---|---|
| *H04W 24/00* | (2009.01) |
| *H04W 4/20* | (2009.01) |
| *H04L 29/08* | (2006.01) |
| *G10L 15/22* | (2006.01) |
| *G10L 25/51* | (2013.01) |
| *H04W 4/02* | (2009.01) |
| *H04L 12/58* | (2006.01) |
| *G06Q 50/00* | (2012.01) |

(52) U.S. Cl.
CPC ............ *H04W 4/206* (2013.01); *G10L 15/22* (2013.01); *G10L 25/51* (2013.01); *H04L 51/32* (2013.01); *H04L 67/10* (2013.01); *H04W 4/023* (2013.01); *G06Q 50/01* (2013.01)

(58) Field of Classification Search
CPC ...... H04W 6/206; H04W 6/023; H04L 67/10; H04L 51/32; G10L 15/22; G10L 25/51; G06Q 50/01

USPC ............ 455/456.1–456.3, 457, 414.1–414.2
See application file for complete search history.

(56) References Cited

U.S. PATENT DOCUMENTS

| | | | |
|---|---|---|---|
| 6,308,158 B1 * | 10/2001 | Kuhnen | G10L 15/30 |
| | | | 704/235 |
| 6,539,232 B2 | 3/2003 | Hendrey et al. | |
| 6,618,593 B1 | 9/2003 | Drutman et al. | |
| 7,013,301 B2 | 3/2006 | Holm et al. | |
| 9,083,728 B1 | 7/2015 | Lavian et al. | |
| 2008/0086319 A1 | 4/2008 | Berger | |
| 2008/0147743 A1 | 6/2008 | Taylor et al. | |
| 2009/0138546 A1 | 5/2009 | Cruzada | |
| 2009/0235335 A1 | 9/2009 | Mendiola | |

(Continued)

FOREIGN PATENT DOCUMENTS

| | | |
|---|---|---|
| CN | 103905288 A | 7/2014 |
| CN | 104935500 A | 9/2015 |

*Primary Examiner* — Wayne Cai
(74) *Attorney, Agent, or Firm* — Cantor Colburn LLP; William A. Kinnaman, Jr.

(57) ABSTRACT

A computer-implemented method for recommending a friend for a network utilizing a host site. The method includes obtaining, using a processor system, a first audio recording from a first user device associated with a first member having a first member profile affiliated with the host site and a second audio recording from a second user device associated with a second member having a second member profile affiliated with the host site. Determining if the first and second user are in proximity by comparing the first and second audio recordings; and based on a determination that the first and second users are in proximity, initiating steps for associating the first member profile with the second member profile via the host site.

19 Claims, 7 Drawing Sheets

(56) References Cited

U.S. PATENT DOCUMENTS

| | | | |
|---|---|---|---|
| 2011/0238755 A1 | 9/2011 | Khan et al. | |
| 2014/0032669 A1* | 1/2014 | Hughes | H04W 4/023 709/204 |
| 2014/0337131 A1 | 11/2014 | Edara | |
| 2015/0154769 A1* | 6/2015 | Anderson | H04W 4/02 345/441 |
| 2015/0302846 A1 | 10/2015 | Song et al. | |
| 2015/0310507 A1* | 10/2015 | Woodward | H04L 51/32 705/329 |
| 2016/0212138 A1* | 7/2016 | Lehane | H04L 63/102 |

* cited by examiner

AUTOMATIC FRIEND CONNECTION WITHIN A SOCIAL NETWORK

BACKGROUND

Colleagues, friends and business acquaintances routinely share access to their personal social media information by sending out "friend" requests which when accepted link the profiles of the two individuals with each other so they may interact with one another and receive updates made on the host sites. However, the process of "friending" an individual is time consuming requiring accessing a particular host site or application, locating the particular individual whom a request is desired, and submitting the request. Likewise, the recipient of the friend request must access the host site or application, and accept the request. While suitable for its intended purpose, the "friend" process is cumbersome and not conducive in certain social settings where individuals meet for the first time. Accordingly, there is a need to provide an autonomous friend connection methodology.

SUMMARY

One embodiment includes a computer-implemented method for recommending a friend for a social network. The method includes obtaining, using a processor system, a first audio recording from a first user device associated with a first member having a first member profile affiliated with a host site and a second audio recording from a second user device associated with a second member having a second member profile affiliated with the host site. The first and second audio recordings are compared to determine if the first and second users are in proximity with one another. Based on a determination that the first and second users are in proximity, initiating steps for associating the first member profile with the second member profile via the host site.

One or more embodiments include a system for recommending a friend for a social network. The system includes a memory a first audio recording from a first user device associated with a first member having a first member profile affiliated with a host site and storing a second audio recording from a second user device associated with a second member having a second member profile affiliated with the host site. A processor system communicatively coupled to the memory wherein the processor is configured to determine if the first and second user are in proximity by comparing the first and second audio recordings; and based on a determination that the first and second users are in proximity, initiating steps for associating the first member profile with the second member profile via the host site.

One or more embodiments of the present disclosure present a computer program product for recommending a friend for a social network. The computer program product comprising a computer readable storage medium having program instructions embodied therewith, wherein the computer readable storage medium is not a transitory signal per se, the program instructions readable by a processing circuit to cause the processing circuit to perform a method for recommending a friend for a host site which includes obtaining, using a processor system, a first audio recording from a first user device associated with a first member having a first member profile affiliated with a host site and obtaining, using a processor system, a second audio recording from a second user device associated with a second member having a second member profile affiliated with the host site. The first and second audio recordings are compared to determine if the first and second users are in proximity to each other. Based on a determination that the first and second users are in proximity, initiating steps for associating the first member profile with the second member profile via the host site.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments of the present disclosure include systems, computer program products, and method for recommending a friend via a social network utilizing a host site. Individuals establish profiles on social network sites which contain information regarding their business and personal lives. These profiles are intended for other individuals to review and are typically utilized as a single source of conveying information to a mass audience such as family members while being kept private for the general public. For certain host sites, "friends" may be designated which enable the profiles of respective individuals to be linked. In this manner, when one profile is updated, the "friend" is automatically notified of the update enabling the person to be kept informed. The invention enables the automatic "friending" of individuals by establishing that two individuals desire to become "friends" and are located in the proximity of each other based on analyzing audio files recorded by their respective user devices.

Figure 1:
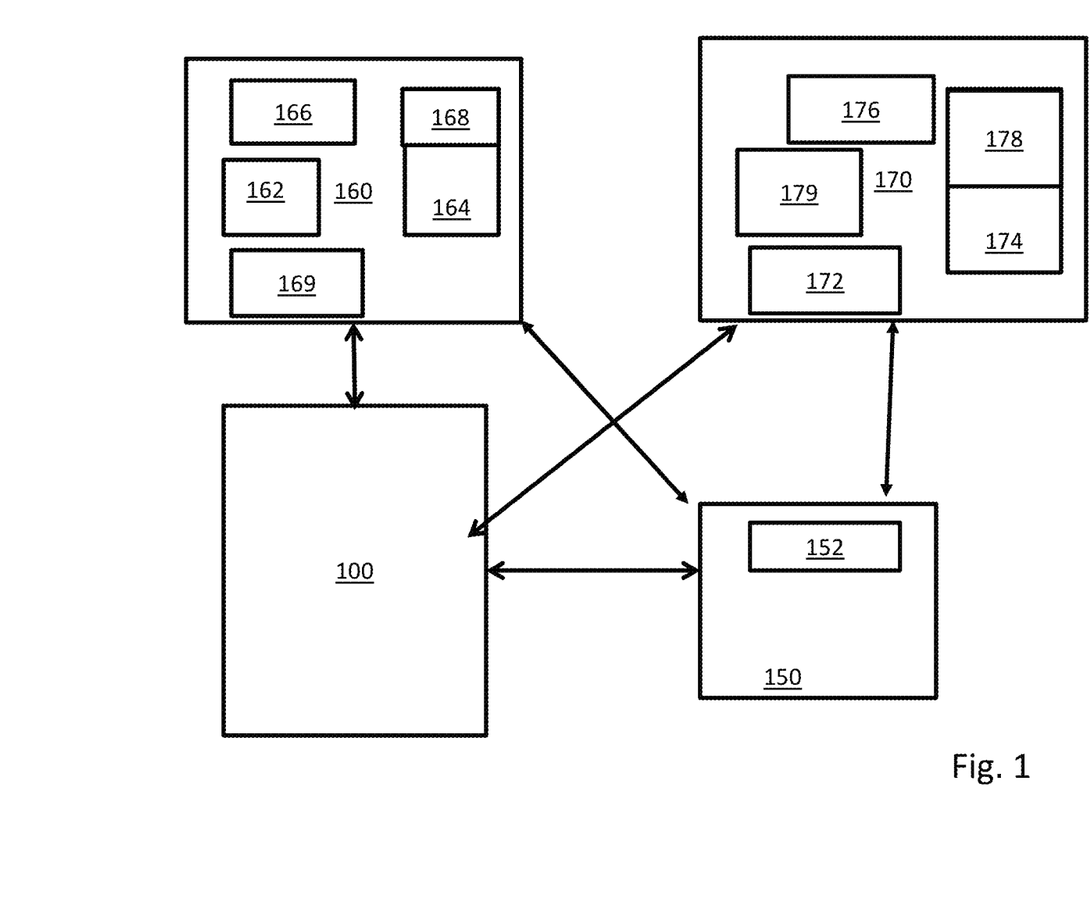
FIG. 1 illustrates a general overview of a system for automatically recommending friends for a social network according to one or more embodiments.

Turning now to a more detailed description of the present disclosure, there is shown in FIG. 1, a primary computer system 100 which interfaces with a first user device 160 and a second user device 170. First and second user devices 160 and 170 may be any type of computing device capable of communicating with another user device via a network. User devices 160 and 170 may include a desktop computer, a laptop mobile computer, a personal data assistant, or a smartphone. First user device 160 includes a memory 164 and a processor 162 for controlling the operation of first user device 160. Second user device 170 includes a memory 174 and a processor 172 for controlling the operation of second user device 170. In an embodiment, first and second user devices 160 and 170 are mobile devices such as a smartphone and the respective memories and processors run applications for host sites such as FACEBOOK® or LINKEDIN® where the respective users have established personal profiles. Host site 150 contains a plurality of user profiles 152 and related operational software enabling a user device to interface with the host site 150 including accessing a profile associated with the user.

First user device memory 164 includes a first user identifier 168 which is utilized by the host site 150 for associating the device with a respective profile associated with the first user in conjunction with the host site. Second user device memory 174 includes a second user identifier 178 for associating the second user with a respective profile associated with the second user in conjunction with the host site. Computer system 100 may interface with the respective user devices 160 and 170 and the host site 150 for automatically affiliating the respective individual profiles associated with the first and second user devices with each other according to an embodiment of the present invention. First and second user devices 160 and 170 may also include Global Positioning systems (GPS) 166 and 176 or other location systems for identifying the location of the respective user devices. First and second user devices 160 and 170 include recording systems 169 and 179 respectively which include a microphone for recording audio and generating corresponding audio files which the recording systems may subsequently transmit to computer system 100.

Figure 2:
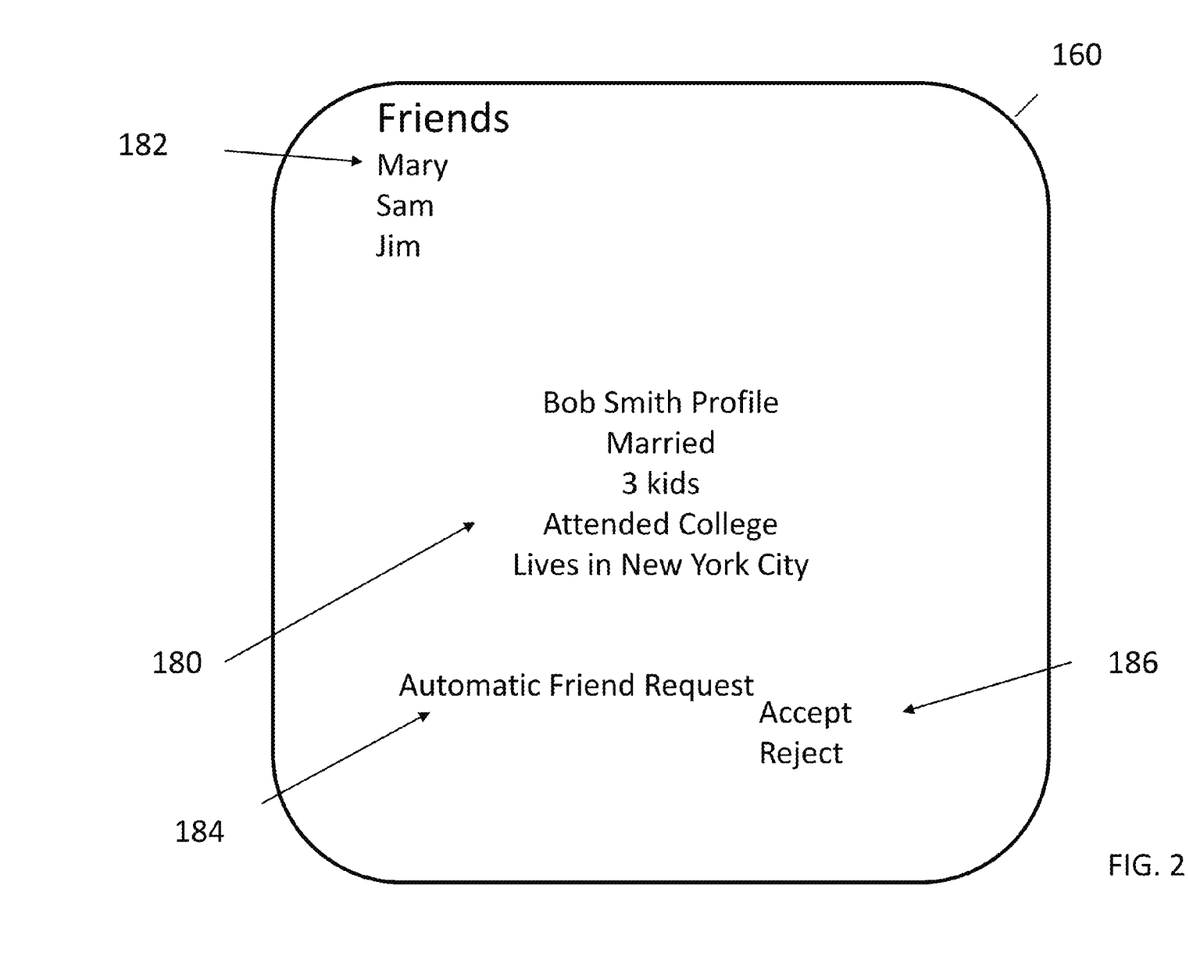
FIG. 2 illustrates a user profile of a social media displayed on a user device according to one or more embodiments.

As shown in FIG. 2, user device 160 displays a user profile 180 of the first user as presented by an application processed by processor 162. The user profile 180 identifies the user and certain personal information. Friends or other individuals who have been allowed special access to the user profile are identified in the friends list 182. The display provides for an automatic friend request function 184 to initiate friend requests with other individuals. In some embodiments an accept/deny feature 186 of friend requests submitted to the first user may be utilized if the individual does not want to automatically accept the friend request.

Figure 3:
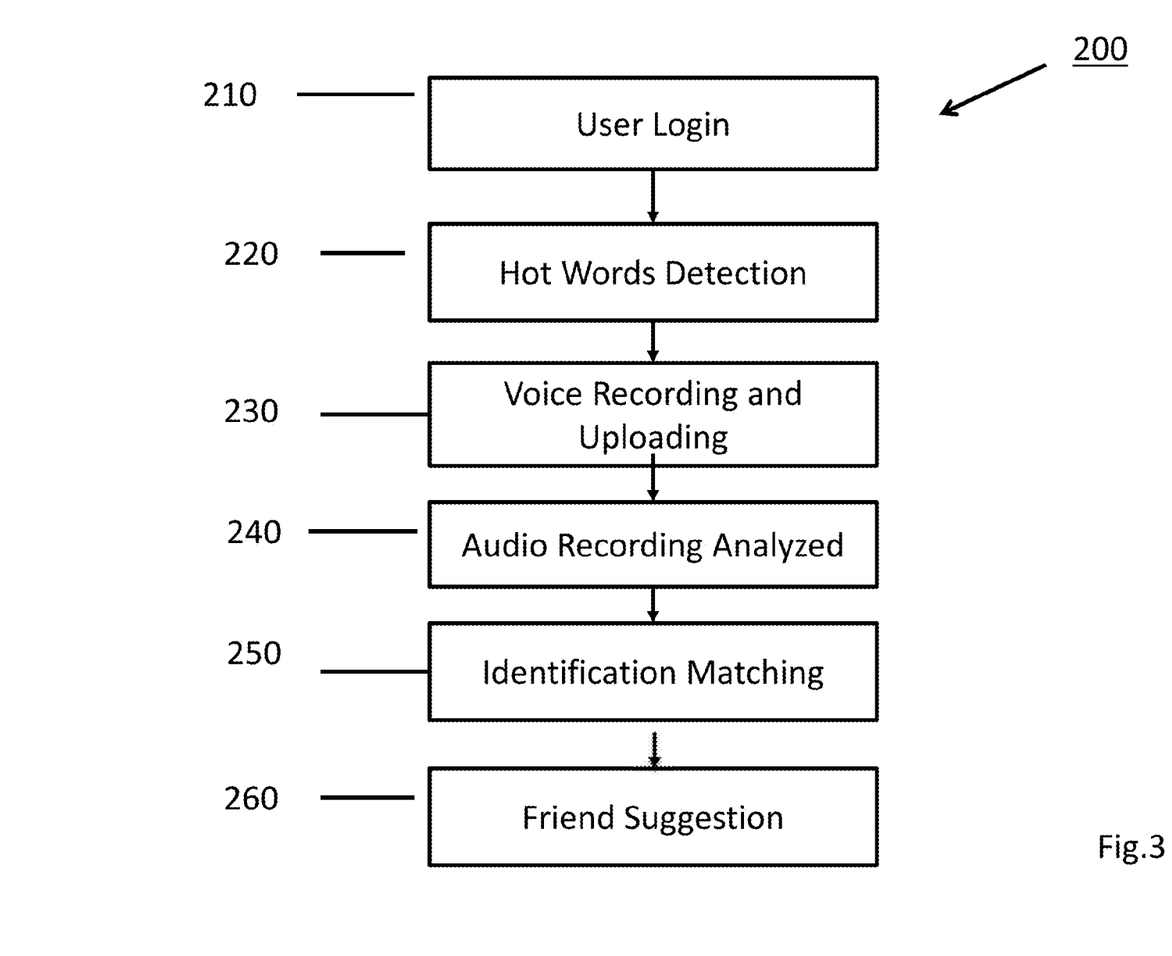
FIG. 3 illustrates a flow chart of a system for automatically recommending friends for a social network according to one or more embodiments.

According to one embodiment, individuals may automatically have their profiles associated with one another utilizing their respective user devices in conjunction with computer system 100. The automatic friend request system is utilized in a social setting where a group of individuals is congregating, such as a birthday event or alumni function for a university. In this environment, individuals rapidly engage in meeting other individuals and subsequently move onto meeting others. The automatic friend request system requires at least two individuals who simultaneously enable their respective user devices to support the automatic friend request system. FIG. 3 is a flow chart illustrating one method for the operational processing of an automatic friend request system 200 between users of their respective user devices. Initially, at block 210 a user login is utilized for initializing the automatic friend request system 200. The user login may be a standalone module initiating the first user device to processing subsequent modules utilized in the automatic friend request system 200. In an additional embodiment, the user login may be associated with a particular application such as a social media application and initiated within the operation of the social media application running on the user device accessing and interfacing with the host site 150. The user login function is activated on two separate user devices for initiating the automatic friend request system between the respective individuals associated with the respective user devices.

In one embodiment, when the user login module has been activated, the recording features of the user device are enabled. At block 220, the microphone of the respective user device is active for identifying a voice command to initiate recording of the conversation for utilization in identifying "friends". Such voice commands can include hot words which are keywords spoken by the user to indicate the desire to add the individual they are conversing with as a "friends". In the event that a voice command is received by the microphone indicating that an automatic "friend" request is desired, at block 230, an audio recording is initiated for recording the conversation which is taking place between the user and an individual whom the user would like to exchange friend requests with. The audio recording will record for a predetermined time and upload the recording to the computer system 100 for analysis.

The automatic friend request system requires that at least two users are simultaneously requesting to become friends. The analysis of the audio recording is conducted to identify the individual whom the user is requesting to become friends with. The automatic friend request system requires the simultaneous transmission of the audio recording which is recorded by user device 160 and the audio recording which is recorded by user device 170. The audio recordings are analyzed at block 240 to determine if the audio recordings from the separate user devices are similar enough to correspond to the same conversation indicating that the two individuals are in proximity with one another. Verifying that the two individuals are in proximity with each other while the automatic friend request system has been initialized identifies that the users would like the other individual to become a "friend" of their social network.

At block 250, if it has been determined that the audio recordings identify the same conversation, the respective profiles of the users with the host site are identified. The respective user identification associated with the social media profile is provided by the user device. At block 260 a "friend" request is subsequently provided by the host site to the individuals associated with user device 160 and user device 170 for accepting the other individual as a "friend". In one embodiment, the "friend" request is automatically accepted by the system.

Figure 4:
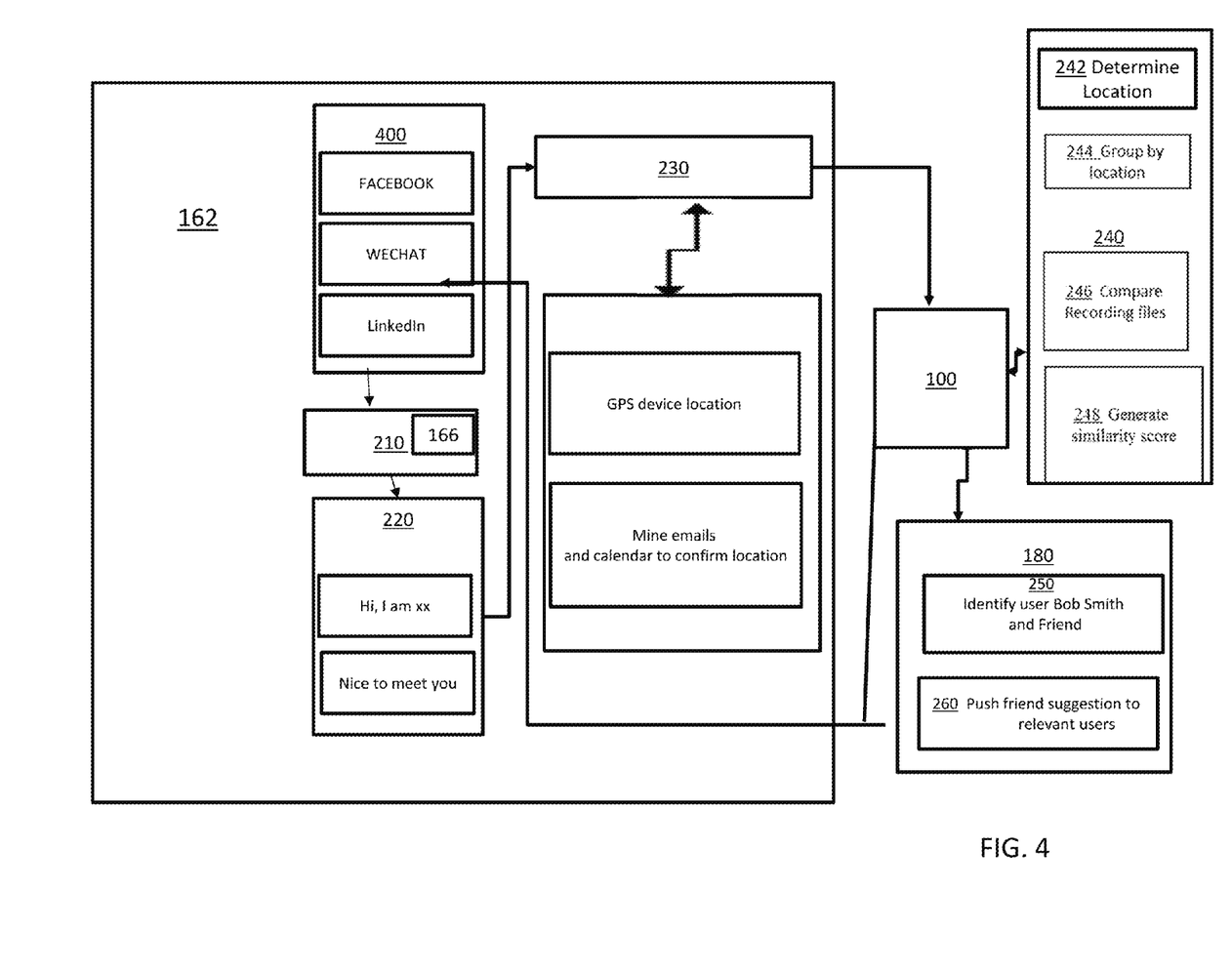
FIG. 4 illustrates a system for automatically recommending friends for a social network according to one or more embodiments.

FIG. 4 is a systems diagram showing the operation of the steps of the automatic friend request system with the respective system components. As shown in FIG. 4, user device 160 is illustrated, user device 170 utilizes similar features. User device 160 includes a plurality of website applications 400 which provide an interface for accessing a host site 150. Certain website applications include FACEBOOK®, LINKEDIN®, and WECHAT®. In one embodiment, the automatic friend request system is associated with a particular website application such as Facebook. In operation, if an individual at a social function would like to add "friends" to their respective Facebook profile, the instructions associated with the Facebook application would be processed by the processor of the user device 160. With the Facebook application running, the user would proceed with the user login 210 which initiates the automatic friend request system. With the user login, the first user identifier 168 is provided. With reference to FIG. 2, the user profile of Bob Smith is displayed by the user device 160 and the user login function is provided by the automatic friend request feature 184. When the user login function is activated, the first user identifier 168 associating the user device 160 with Bob Smith will be utilized for identifying that the profile of Bob Smith is requesting friends be associated with the web hosting site.

With the initiation of the user login function, the microphone of the user device 160 is activated and is responsive to a verbal command to initiate an audio recording which will be utilized for determining individuals who are requesting to be friends. In operation, at a social event, the user Bob Smith after initiating the user login function may determine upon meeting someone that he would like to become "friends" with that person. To initiate the automatic friend request system, the user Bob may introduce himself with the phrase, "Hi, my name is Bob Smith", or "nice to meet you", these phrases may contain hot or keywords which when detected by the microphone identifies that the automatic friend request system should start an audio recording of the ongoing conversation. Voice recording system 169 records audio of the surrounding conversation for a predetermined time. To assist in identifying the individuals, the automatic friend request system may also provide the location of the respective user devices via the GPS system or provide location information by accessing the individual's email and calendar. For instance, a calendar entry may indicate that Bob is attending a baseball game in Atlanta on this particular day and time.

The location and audio recordings are transmitted from the user device 160 to the computer system 100. Computer system 100 analyzes the voice recordings to determine the respective location of individuals who are interested in becoming "friends". Computer system 100 receives multiple simultaneous requests from social media users throughout the world. To assist in coordinating the plurality of audio files, the geographic origin of the audio files is determined at block 242 preferably utilizing the GPS information provided with the uploading of the respective audio files. The audio files having a common GPS location are grouped at block 244. Additionally, if calendar information is provided, the computer system 100 will group Bob with the Atlanta baseball game and coordinate his respective voice recording with other individuals whose location information also associated themselves with the Atlanta baseball game or similar GPS location.

Figure 5:
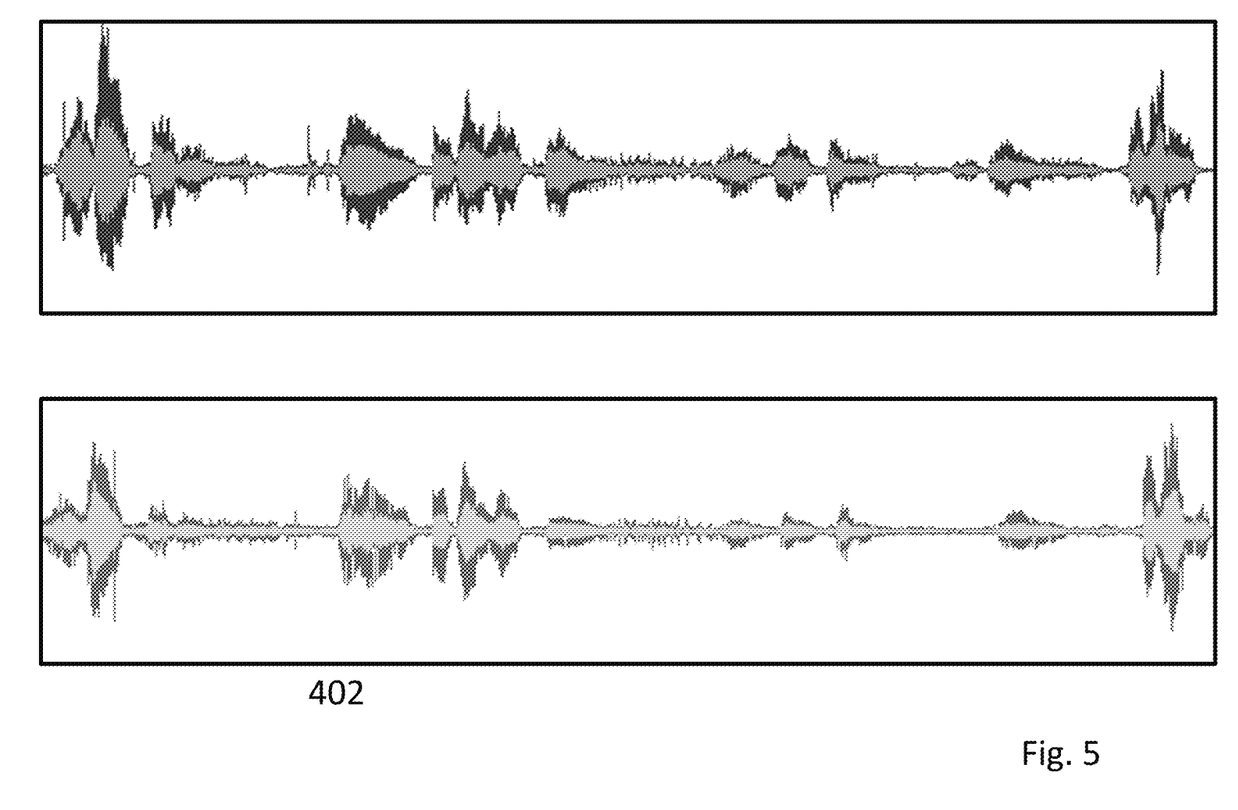
FIG. 5 illustrates two audio files for analysis to determine proximity of two users for recommending friends for a social network according to one or more embodiments.

After being grouped, the audio files are analyzed at block 246 to determine if two audio files match. The matching identifies the specific individuals who would like to become "friends" due to their proximate location. The matching process may be conducted utilizing a textual analysis of the voice recordings. If the two audio files both contain certain words, a statistical analysis may be conducted to produce a certainty score at block 248 to ascertain if enough words are present to indicate that the audio recordings are representative of the sounds in the same location indicating that the two individuals are in proximity to one another. In an alternative embodiment, as shown in FIG. 5, the audio files may be analyzed with respect to the waveform footprint 402 created by the respective audio. Evaluating the audio in this manner considers the ambient sounds which may be present. As shown in FIG. 5, the respective audio files are not required to be identical but proximate to indicate that the two sound recordings originate from the same location from two different sources. The certainty score is produced based on the analysis of the audio waveform footprint.

Figure 6:
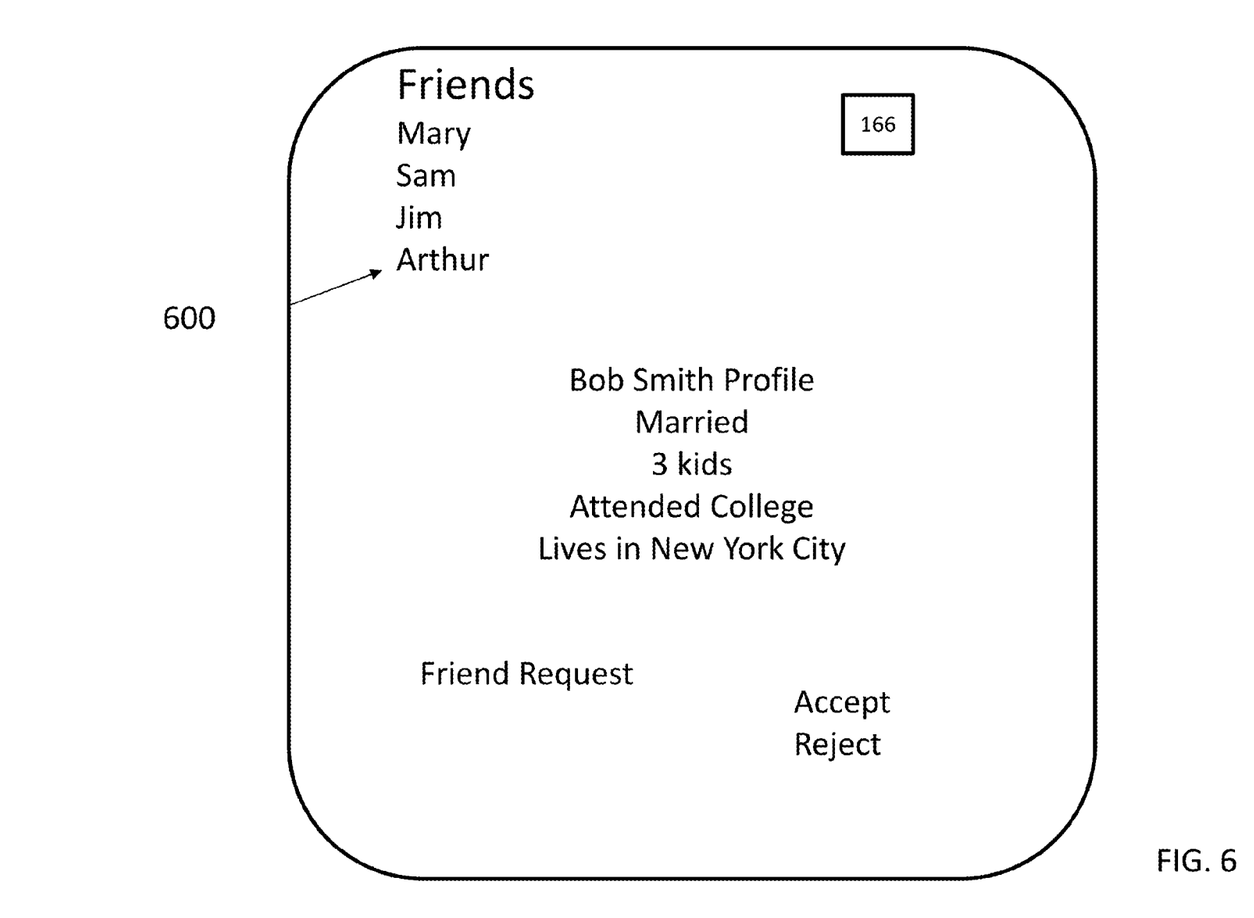
FIG. 6. illustrates an updated friend for a user profile according to one or more embodiments.

When two audio files are identified as being similar, this indicates that the users associated with the respective audio file are in a proximate location and have activated the automatic friend request feature of their user device. With both individuals having activated the automatic friend request feature of their user device and transmitting an audio file which has been compared as originating from the same proximate location, the respective user identifiers associated with the user device is utilized for identifying the social media profile for that particular user. In an example system as shown in FIG. 1, the user identifier 168 associated with Bob Smith is utilized for accessing the correct Bob Smith profile from the host site. Additionally, the respective user who is being requested as a friend associated with user device 170 is also identified by the second user identifier provide with the respective audio recording. With the identification of the respective users, a "friend" request from the individual associated with user device 170 may be originated by the host site 150 and transmitted to Bob Smith's user device 160. Additionally, the user of second user device 170 will receive a "friend" request from Bob Smith. In one embodiment, the "friend" request is automatically accepted by the host site. As shown in FIG. 6, friend "Arthur" 600 who is the user of user device 170 and had also activated the automatic friend request system on his user device has automatically been added to Bob Smith's friend list for his social media profile, and Bob Smith's profile is automatically added to Arthur's social media profile, not shown.

Figure 7:
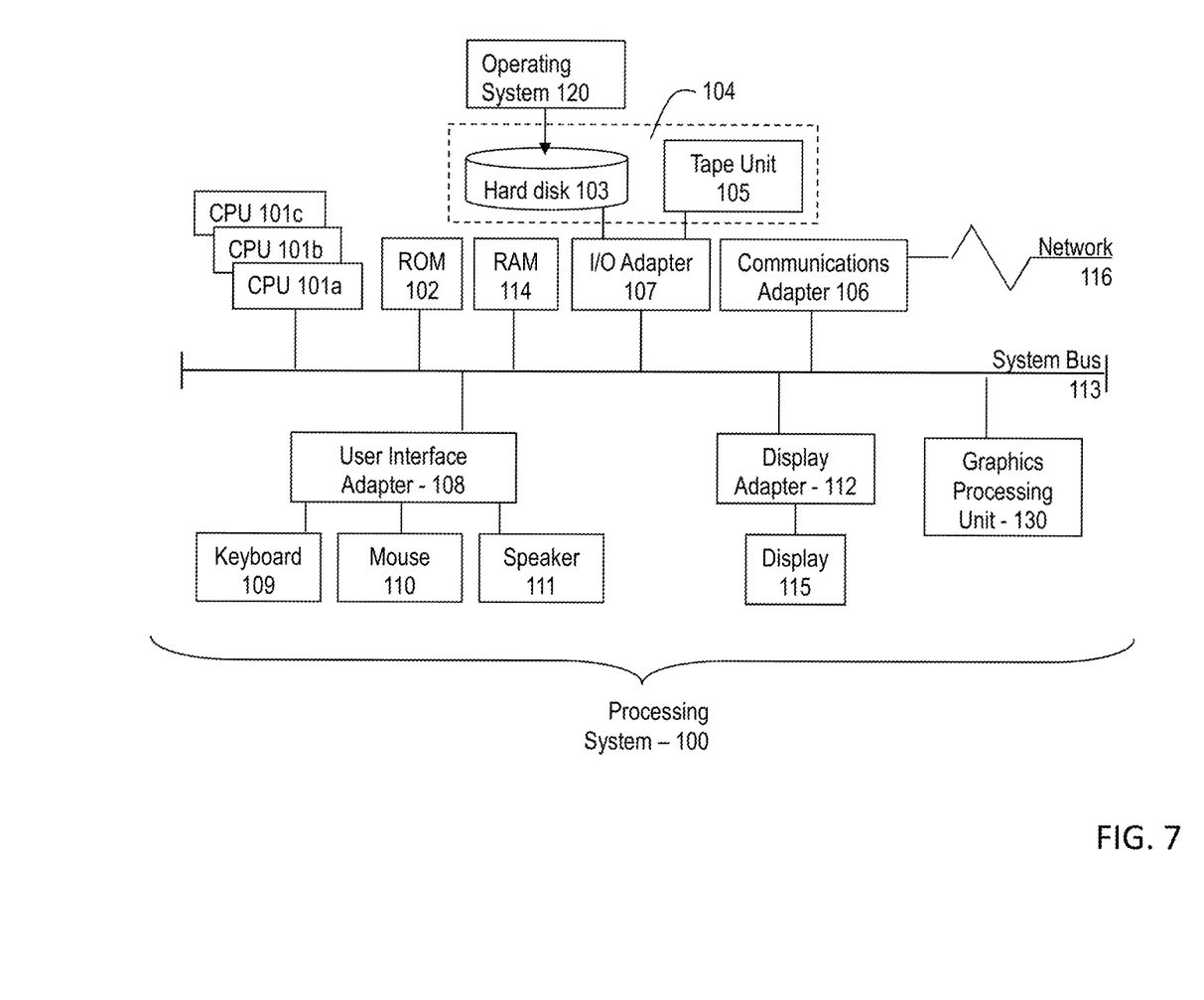
FIG. 7 illustrates a computer system according to an embodiment.

Referring to FIG. 7, there is shown primary computer system 100 according to one or more embodiments. First computing device 160 and second computing device may have the same configuration as primary computer system 100. The primary computer system 100 has one or more central processing units (processors) 101a, 101b, 101c, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 5 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling log management system 100 to communicate with other such systems. A screen (e.g., a display monitor) 115 is connected to system bus 113 by display adaptor 112, which may include a graphics adapter to improve the performance of graphics intensive applications and a video controller. In one or more embodiments, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 5, the processing system 100 includes processing capability in the form of processors 101, storage capability including the system memory 114 and mass storage 104, input means such as keyboard 109 and mouse 110, and output capability including speaker 111 and display 115. In one or more embodiments, a portion of system memory 114 and mass storage 104 collectively store an operating system to coordinate the functions of the various components shown in FIG. 4.

In this illustrative example, the advantage of the embodiment as shown enables individuals in a group setting to establish "friend" connections with individuals in a quick and autonomous manner. Typical friend requests require an individual to locate the specific person they would like to become friends with. This is time-consuming requiring an individual to disengage from a conversation to access their social media application on their respective smartphone, and look up the profile of the individual they were talking with to initiate the steps to become "friends". However, locating a specific profile is cumbersome as the individual may spell the name incorrectly, or find several profiles with the same name requiring additional time to ascertain which profile actually corresponds with the individual they were conversing with. The present invention automatically "friends" individuals with their permissions by their activity logging into the automatic friend request system. This step identifies that the individual desires to obtain "friends" at the social function. Audio files recorded by the users of the respective user devices are compared to identify if the recordings identify that the respective individuals are in close proximity to one another. This determination illustrates that the individuals associated with the user devices which provided the audio recordings are the specific individuals whose social media profiles are to be "friended". The primary web hosting site of the social media site utilizes the user identifications provided by the user devices to initiate the process to "friend" the respective profiles. The system enables the respective users to maintain a conversation and social interaction while the "friend" process is initiated and completed without further intervention by the respective users.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically enidentifierd device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, micro-identifier, firmware instructions, state-setting data, or either source identifier or object identifier written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for recommending a friend for a social network utilizing a host site, the method comprising:
   obtaining, using a processor system, a first audio recording from a first user device associated with a first member having a first member profile affiliated with the host site, wherein the first user device includes a microphone that is activated upon initiation of a user login via the first user device, wherein the microphone of the first user device, once activated, becomes responsive to a verbal command to initiate recording of audio, wherein the recording of the first audio was initiated by the microphone of the first user device in response to receipt of a verbal command indicating an intent of the first member to associate the first member profile with the second member profile via the host site;
   obtaining, using the processor system, a second audio recording from a second user device associated with a second member having a second member profile affiliated with the host site;
   determining whether the first user device and the second user device are in proximity of one another by comparing the first audio recording with the second audio recording; and
   based on a determination that the first user device and the second user device are in proximity, associating the first member profile with the second member profile via the host site.

2. The computer-implemented method of claim 1, wherein the first user device is a first mobile apparatus comprising a processor and memory in data communication with the processor, and a global positioning system (GPS) configured to generate information related to a current location of the first mobile apparatus and the second user device is a second mobile apparatus comprising a processor and memory in data communication with the processor, and a global positioning system (GPS) configured to generate information related to a current location of the second mobile apparatus.

3. The computer-implemented method of claim 2, wherein determining whether the first user device and second user device are in proximity includes receiving information relating to the current location of the first user device as provided by the GPS of the first user device and receiving information relating to the current location of the second user device as provided by the GPS of the second user device.

4. The computer-implemented method of claim 2, wherein the memory of the first user device stores at least one application computer program configured for accessing the host site and the memory of the second user device stores at least one application computer program configured for accessing the host site.

5. The computer-implemented method of claim 4, wherein the memory of the first user device stores a first user identifier identifying the first user with the first member profile associated with the host site, and wherein the first user identifier is transmitted with the first audio recording identifying an origin of the first audio recording and associating the audio recording with the first user.

6. The computer-implemented method of claim 5, wherein the memory of the second user device stores a second user identifier identifying the second user with the second member profile associated with the host site, and wherein the second user identifier is transmitted with the second audio recording identifying the origin of the second audio recording and associating the audio recording with the second user.

7. The computer-implemented method of claim 4, further including determining that the first user has enabled the host site for accepting friend requests and recording the first audio recording based upon receiving an instruction to initiate recording.

8. The computer-implemented method of claim 1, wherein the step of determining whether the first user device and second user device are in proximity by comparing the first audio recording and the second audio recording includes comparing words contained within the first audio recording and the second audio recording and determining that the words are associated with a common conversation recorded simultaneously by the first and second user devices indicating that the first user device and the second user device are in proximity.

9. The computer-implemented method of claim 1, wherein the step of determining whether the first user device and second user device are in proximity includes analyzing an audio footprint of the first audio recording with an audio footprint of the second audio recording and identifying that the audio recordings are associated with a common conversation recorded simultaneously by the first and second user devices indicating that the first and second user devices are in proximity.

10. The computer-implemented method of claim 1, wherein the step of associating the first member profile with the second member profile via the host site includes sending an invitation to the first user device to accept the second user as an authorized follower of the first user's profile via the host site.

11. A system for recommending a friend for a social network utilizing a host site, the system comprising:
   a memory storing a first audio recording from a first user device associated with a first member having a first member profile affiliated with the host site and storing a second audio recording from a second user device associated with a second member having a second member profile affiliated with the host site;

wherein the first user device includes a microphone that is activated upon initiation of a user login via the first user device, wherein the microphone of the first user device, once activated, becomes responsive to a verbal command to initiate recording of audio, wherein the recording of the first audio was initiated by the microphone of the first user device in response to receipt of a verbal command indicating an intent of the first member to associate the first member profile with the second member profile via the host site; and a processor system communicatively coupled to the memory;

wherein the processor is configured to:
determine if the first and second user are in proximity by comparing the first audio recording and the second audio recording; and
based on a determination that the first user device and the second user device are in proximity, associating the first member profile with the second member profile via the host site.

12. The system of claim 11, including a first user device comprising a processor and memory in data communication with the processor, and a global positioning system (GPS) configured to generate information relating to a current location of the first user device and a second user device comprising a processor and memory in data communication with the processor, and a global positioning system (GPS) configured to generate information relating to a current location of the second user device.

13. The system of claim 12, wherein the memory of the first user device stores at least one application computer program configured for accessing the host site and the memory of the second user device stores at least one application computer program configured for accessing the host site.

14. The system of claim 13, wherein the memory of the first user device stores a first user identifier identifying the first user with the first member profile associated with the host site, and wherein the first user identifier is transmitted with the first audio recording identifying an origin of the first audio recording and associating the audio recording with the first user and wherein the memory of the second user device stores a second user identifier identifying the second user with the second member profile associated with the host site, and wherein the second user identifier is transmitted with the second audio recording identifying an origin of the second audio recording and associating the audio recording with the second user.

15. The system of claim 14, wherein the processor is configured to determine if the first user device and second user device are in proximity by comparing the context of words contained within the first audio recording and second audio recording and determining a context score identifying that the words are associated with a common conversation recorded simultaneously by the first user device and second user device indicating that the first user device and second user device are in proximity.

16. The system of claim 14, wherein the processor is configured to determine if the first user device and second user device are in proximity by analyzing an audio footprint of the first audio recording with an audio footprint of the second audio recording and identifying that the audio recordings are associated with a common conversation recorded simultaneously by the first user device and second user device indicating that the first user device and second user device are in proximity.

17. A computer program product for recommending a friend for a social network utilizing a host site, the computer program product comprising a computer readable storage medium having program instructions embodied therewith, wherein the computer readable storage medium is not a transitory signal per se, the program instructions readable by a processing circuit to cause the processing circuit to perform a method comprising:
obtaining, using a processor system, a first audio recording from a first user device associated with a first member having a first member profile affiliated with the host site, wherein the first user device includes a microphone that is activated upon initiation of a user login via the first user device, wherein the microphone of the first user device, once activated, becomes responsive to a verbal command to initiate recording of audio, wherein the recording of the first audio was initiated by the microphone of the first user device in response to receipt of a verbal command indicating an intent of the first member to associate the first member profile with the second member profile via the host site;
obtaining, using a processor system, a second audio recording from a second user device associated with a second member having a second member profile affiliated with the host site;
determining whether the first user device and the second user device are in proximity of one another by comparing the first audio recording with the second audio recording; and
based on a determination that the first user device and the second user device are in proximity, associating the first member profile with the second member profile via the host site.

18. The computer program product of claim 17, wherein determining whether the first user device and second user device are in proximity by comparing the first audio recording and the second audio recording includes comparing the context of words contained within the first audio recording and the second audio recording and determining a context score identifying that the words are associated with a common conversation recorded simultaneously by the first user device and second user device.

19. The computer program product of claim 17, wherein determining whether determining if the first user device and second user device are in proximity include analyzing an audio footprint of the first audio recording with an audio footprint of the second audio recording identifying that the audio recordings are associated with a common conversation recorded simultaneously by the first user device and second user device.

* * * * *